(12) United States Patent
Cheng

(10) Patent No.: US 11,076,142 B2
(45) Date of Patent: Jul. 27, 2021

(54) REAL-TIME ALIASING RENDERING METHOD FOR 3D VR VIDEO AND VIRTUAL THREE-DIMENSIONAL SCENE

(71) Applicant: IDEAPOOL CULTURE & TECHNOLOGY CO., LTD., Beijing (CN)

(72) Inventor: Bin Cheng, Beijing (CN)

(73) Assignee: IDEAPOOL CULTURE & TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/641,271

(22) PCT Filed: Sep. 4, 2017

(86) PCT No.: PCT/CN2017/100412
§ 371 (c)(1),
(2) Date: Feb. 24, 2020

(87) PCT Pub. No.: WO2019/041351
PCT Pub. Date: Mar. 7, 2019

(65) Prior Publication Data
US 2020/0358996 A1    Nov. 12, 2020

(51) Int. Cl.
*H04N 13/111* (2018.01)
*H04N 13/15* (2018.01)
(Continued)

(52) U.S. Cl.
CPC .......... *H04N 13/111* (2018.05); *G06T 19/006* (2013.01); *G06T 19/20* (2013.01);
(Continued)

(58) Field of Classification Search
CPC .................. H04N 13/111; H04N 13/15; H04N 2213/002; H04N 2213/008; G06T 19/006; G06T 19/20; G06T 2219/2016
See application file for complete search history.

(56) References Cited

U.S. PATENT DOCUMENTS

2010/0085423 A1    4/2010  Lange
2012/0050256 A1*   3/2012  Thiel ..................... G06T 19/003
                                                          345/419
(Continued)

FOREIGN PATENT DOCUMENTS

CN    103136793 A    6/2013
CN    104836938 A    8/2015
(Continued)

OTHER PUBLICATIONS

International Search Report dated Jun. 1, 2018 for PCT/CN2017/100412.

*Primary Examiner* — Haixia Du
(74) *Attorney, Agent, or Firm* — Schmeiser, Olsen & Watts, LLP

(57) ABSTRACT

Provided is a real-time aliasing rendering method for a 3D VR video and a virtual three-dimensional scene, including: capturing 3D camera video signals in real time and process the same to generate texture data; creating a virtual three-dimensional scene according to the proportion of a real scene; generating virtual camera rendering parameters according to a physical position of the 3D camera and a shooting angle relationship; aliasing the texture data onto a virtual three-dimensional object in a virtual scene, and adjusting the position of the virtual three-dimensional object according to a physical positional relationship between the virtual three-dimensional scene and the real scene, so as to form a complete virtual reality combined three-dimensional scene; rendering the virtual reality combined three-dimen-
(Continued)

sional scene by using the virtual camera rendering parameters to obtain a simulated rendering picture.

10 Claims, 3 Drawing Sheets

(51) Int. Cl.
  *G06T 19/00*  (2011.01)
  *G06T 19/20*  (2011.01)
(52) U.S. Cl.
  CPC ..... *H04N 13/15* (2018.05); *G06T 2219/2016* (2013.01); *H04N 2213/002* (2013.01); *H04N 2213/008* (2013.01)

(56) References Cited

U.S. PATENT DOCUMENTS

| | | | | |
|---|---|---|---|---|
| 2014/0132715 | A1* | 5/2014 | Raghoebardayal | A63F 13/40 348/43 |
| 2015/0312561 | A1* | 10/2015 | Hoof | H04N 21/41415 348/46 |
| 2018/0310059 | A1* | 10/2018 | Glazner | G06Q 30/0242 |

FOREIGN PATENT DOCUMENTS

| | | |
|---|---|---|
| CN | 106027855 A | 10/2016 |
| CN | 106375748 A | 2/2017 |
| CN | 106385576 A | 2/2017 |
| CN | 106412558 A | 2/2017 |
| CN | 106851244 A | 6/2017 |
| CN | 107077755 A | 8/2017 |

\* cited by examiner

| renderings for the left eye, using data of the left lens of 3D camera, the virtual camera simulates the left lens | renderings for the right eye, using data of the right lens of 3D camera, the virtual camera simulates the right lens |
|---|---|

VR glasses typesetting

FIG. 3

| 360 panorama renderings for the left eye, using data of the left lens of 3D camera, the virtual camera simulates the left lens |
|---|
| 360 panorama renderings for the right eye, using data of the right lens of 3D camera, the virtual camera simulates the right lens |

360 panorama typesetting

FIG. 4

REAL-TIME ALIASING RENDERING METHOD FOR 3D VR VIDEO AND VIRTUAL THREE-DIMENSIONAL SCENE

CROSS-REFERENCE TO RELATED APPLICATIONS

This application claims priority to PCT Application No. PCT/CN2017/100412, having a filing date of Sep. 4, 2017, the entire contents of which is hereby incorporated by reference.

FIELD OF TECHNOLOGY

The following relates to the field of computer graphics image processing, and in particular to a real-time aliasing rendering method for 3D VR video and virtual three-dimensional scene.

BACKGROUND

VR is the English abbreviation of Virtual Reality, and Chinese means virtual reality. VR video is a panoramic video mode rendered using VR technology. As the emerging video mode in the past two years, it has developed rapidly. It has become an important means of communication for the development of multiple media such as print, television, movies, and the Internet. It is also a commercial market that various software and hardware manufacturers focus on. But with the products on the market today, only simple VR video shooting and simple live broadcast functions can be completed, and slightly more complicated effects require a lot of complicated post-production work.

Currently in the product market, most of them are only focused on the research and development of camera equipment (panoramic cameras) and viewing equipment (VR glasses), but the investment in intermediate production equipment and three-dimensional graphics engine is very small, only foreign A few companies can provide similar products, but also have problems such as single function and complicated operation. Among them, the rendering of video and graphic images is only a simple superimposed rendering of 3D video and graphic images, and does not have the effect of simulation. The generally used 360-camera rendering virtual camera does not adopt the method of simulating left and right eyes, but through subsequent re-production, the rendered video is simply output to virtual equipment such as VR glasses to simulate the scene of left and right eye viewing. And in reality, the objects and scenes seen by the left and right eyes have different perspectives. Therefore, the video produced by the existing 3D video rendering technology lacks realism in detail performance, no real immersion, and can be viewed for a long time. Can cause eye discomfort and dizziness.

SUMMARY

An aspect relates to a real-time aliasing rendering method for 3D VR video and virtual three-dimensional scenes. The method includes:

Collect 3D camera video signals in real time and process the video signals to generate texture data;

Create a virtual 3D scene based on the real scene scale;

Generate and adjust virtual camera rendering parameters based on the 3D camera physical position and shooting angle relationship;

Overlaying the texture data on a specific virtual three-dimensional object in the virtual scene in the form of a texture map according to the picture effect captured by the 3D camera, and adjusting the position of the virtual three-dimensional object according to the physical position relationship between the virtual three-dimensional scene and the real scene, Forming a three-dimensional scene combined with virtual reality;

The rendering process is adjusted corresponding to the rendering parameters of the virtual camera, and the virtual camera rendering parameters are used to render the three-dimensional scene combining virtual and reality to obtain a simulated rendering picture.

Optionally, the texture data includes left-eye scene texture data and right-eye scene texture data, and the left-eye scene texture data and right-eye scene texture data correspond to the left and right lenses of the 3D camera, respectively, as the left eye of the simulated human eye Scene and right eye scene.

In the process of aliasing the texture data to a specific virtual three-dimensional object in the virtual scene, the left-eye scene texture data is used when the left-eye scene is aliased, and the right-eye scene texture data is used when the right-eye scene is aliased. To form three-dimensional scene data of left and right eyes combined with virtual reality.

The process of using the virtual camera rendering parameters to render the three-dimensional scene data of the left and right eyes combined with virtual reality is further: when the left camera parameters of the virtual camera are used to render the three-dimensional scene data of the left eye, the texture map uses the left lens of the virtual camera. Data; when rendering the 3D scene data of the right eye using the right camera parameters of the virtual camera, the texture map uses the data of the right camera of the virtual camera.

The data of a set of simulated rendering images of the left and right eyes is stored in a set of the left and right eyes.

Optionally, the processing of the video signal includes deinterleaving processing of interlaced data and keying processing of the video source data with a blue-green background.

In the step of creating a virtual 3D scene based on the real scene scale, you can optionally create a virtual 3D scene with a fixed conversion scale.

The conversion ratio between the virtual three-dimensional scene and the real scene may be 100:1.

Optionally, generating the virtual camera related parameters includes: camera position generation virtual camera position to simulate a real camera position, camera rotation to simulate a real camera shooting angle, camera opening angle to simulate a real camera Zoom, and lens distance to simulate a real camera lens distance.

When rendering the left-eye scene video signal according to the virtual camera left lens parameter, the texture map uses the data corresponding to the left lens of the virtual camera; when rendering the right-eye scene video signal according to the virtual camera right lens parameter, the texture map uses the corresponding virtual camera right Lens data.

Optionally, rendering includes 360-degree panoramic rendering and VR glasses rendering.

Among them, 360-degree panoramic rendering typesets the left and right eye renderings of each group in an up-to-down 1:1 layout and combines them into a complete picture up and down; VR glasses rendering typesets the left and right eye renderings of each group in a left-to-right 1:1 layout and combines them into a completed picture.

According to embodiments of the present invention, the 360 panoramic pictures of the left eye and the right eye and the virtual graphics and images of the virtual three-dimensional scene are respectively rendered using the position and perspective relationship of the simulated human eye for two independent 360 panoramic renderings, and VR is performed by adopting the technology of the simulation principle of the human eye perspective The rendering of perspective scenes guarantees that the output effect is close to the perspective perceived by the human eye, so that the user is immersed in the environment, so that when the user experiences, the left and right eyes can see the rendered images with poor perspectives more realistically, and long-term viewing will not produce eyes Discomfort, which greatly improves immersion and comfort.

BRIEF DESCRIPTION

Some of the embodiments will be described in detail, with references to the following Figures, wherein like designations denote like members, wherein:

FIG. 3 is a schematic layout diagram of the VR glasses typesetting in FIG. 2 according to an embodiment of the present invention, which simulates left and right eyes through 3D camera left and right lenses; and FIG. 4 is a schematic diagram of 360 panoramic typesetting of left and right eye simulation through left and right lenses of a 3D camera according to an embodiment of the present invention.

DETAILED DESCRIPTION

In order to make the objectives, technical solutions, and advantages of embodiments of the present invention clearer, embodiments of the present invention will be described in further detail with reference to the accompanying drawings. The embodiments described below are only embodiments of the present invention, and they are only used to make embodiments of the present invention more clear. Explanation and description are not used to limit the protection scope of embodiments of the present invention.

Figure 1:
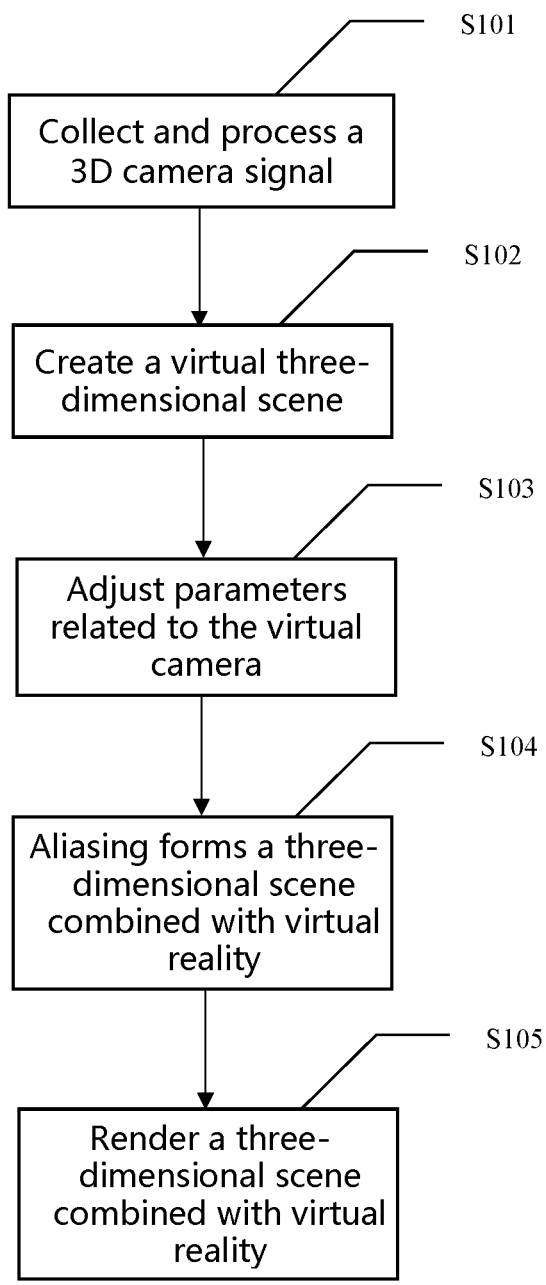
FIG. 1 is a flowchart of a method for real-time aliasing rendering of a 3D VR video and a virtual 3D scene according to embodiments of the present invention.

Referring to FIG. 1, FIG. 1 is a flowchart of a method for real-time aliasing rendering of a 3D VR video and a virtual 3D scene.

As shown in FIG. 1, the method includes:

S101. Collect and process a 3D camera signal.

In this step, a 3D camera video signal is collected and processed in real time to generate texture data;

The processing of the video signal may include deinterleaving processing of interlaced data and keying processing of the video source data with a blue-green background.

S102. Create a virtual three-dimensional scene.

Create a virtual 3D scene according to the real scene scale; optionally, create a virtual 3D scene with a fixed conversion scale;

S103. Adjust parameters related to the virtual camera.

Generate virtual camera rendering parameters according to the real 3D camera physical position and shooting angle relationship;

Optionally, generating the virtual camera related parameters includes: camera position generation virtual camera position to simulate a real camera position, camera rotation to simulate a real camera shooting angle, camera opening angle to simulate a real camera Zoom, and lens distance to simulate a real camera lens distance;

S104. Aliasing forms a three-dimensional scene combined with virtual reality.

Overlaying the texture data on a specific virtual three-dimensional object in the virtual scene in the form of a texture map according to the picture effect captured by the 3D camera, and adjusting the position of the virtual three-dimensional object according to the physical position relationship between the virtual three-dimensional scene and the real scene, Form a three-dimensional scene combined with virtual reality.

S105. Render a three-dimensional scene combined with virtual reality.

The rendering process is adjusted corresponding to the rendering parameters of the virtual camera, and the virtual camera rendering parameters are used to render the three-dimensional scene combining virtual and reality to obtain a simulated rendering picture.

Figure 2:
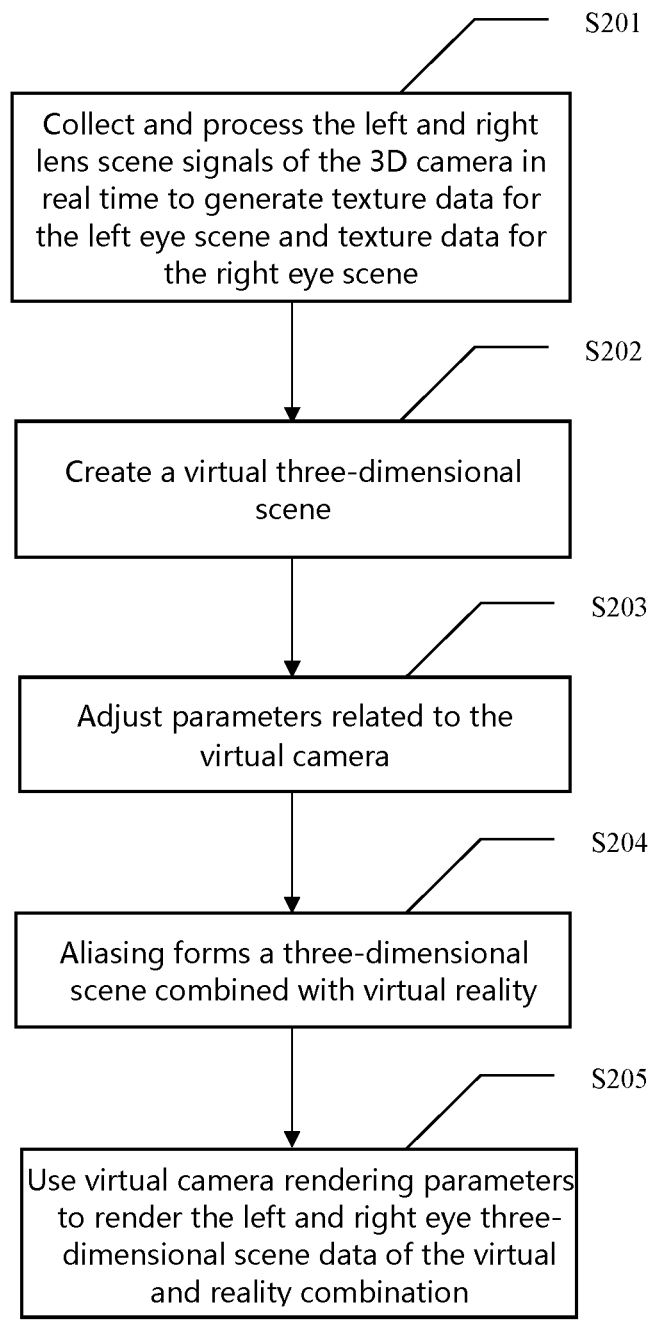
FIG. 2 is a flowchart of a method for real-time aliasing rendering of a 3D VR video and a virtual 3D scene according to an embodiment of the present invention. In this embodiment, left and right eye simulations are performed through left and right lenses of a 3D camera.

Referring to FIG. 2, FIG. 2 is a flowchart of another embodiment of a method for real-time overlay rendering of a 3D VR video and a virtual 3D scene in FIG. 1.

In this embodiment, the human eyes are simulated through the left and right lenses of the 3D camera. The specific steps are:

S201: Collect and process the left and right lens scene signals of the 3D camera in real time to generate texture data for the left eye scene and texture data for the right eye scene.

The scene signals captured by the left and right lenses of the 3D camera are used as the left-eye scene signal and the right-eye scene signal, respectively, for simulating the left-eye scene and the right-eye scene of the human eye.

The processing of the video signal may include deinterleaving processing of interlaced data and keying processing of the video source data with a blue-green background.

S202. Create a virtual three-dimensional scene.

Create a virtual three-dimensional scene according to the real scene scale; optionally, create a virtual three-dimensional scene with a fixed conversion scale.

S203: Adjust parameters related to the virtual camera.

Generate virtual camera rendering parameters based on the real 3D camera physical position and shooting angle relationship.

Optionally, generating the virtual camera related parameters includes: camera position generation virtual camera position to simulate real camera position, camera rotation to simulate real camera shooting angle, camera opening angle to simulate real camera Zoom, and lens distance to simulate real camera lens distance.

S204. Aliasing forms a three-dimensional scene combined with virtual reality. According to the picture effect captured by the 3D camera, the texture data is aliased onto a specific virtual three-dimensional object in the virtual scene. Specifically, according to the picture effect captured by the 3D camera, the texture data is aliased into the form of a texture map. On the specific virtual 3D object in the virtual scene, and adjust the position of the virtual 3D object according to the physical position relationship between the virtual 3D scene and the real scene to form a 3D scene combined with virtual reality.

Wherein, the left-eye scene texture data is used when the left-eye scene is aliased, and the right-eye scene texture data is used when the right-eye scene is aliased to form three-dimensional scene data of the left and right eyes combined with virtual reality.

S205. Use virtual camera rendering parameters to render the left and right eye three-dimensional scene data of the virtual and reality combination.

Among them, when rendering the left-eye 3D scene data according to the left lens parameter of the virtual camera, the texture map uses the data of the left lens of the virtual camera; when rendering the 3D scene data of the right eye according to the right lens parameter of the virtual camera, the texture map uses the right of the virtual camera Lens data.

In addition, the simulated 3D rendered picture data can be stored in a group of left and right eyes.

Referring to FIG. 3, in the manner of VR glasses typesetting for left and right eye simulation through the left and right lenses of the 3D camera, the scenes taken by the left and right lenses of the 3D camera are respectively left eye scene and right eye scene, and are collected and processed to generate multiple The left-eye scene texture data and the right-eye scene texture data of the group are simulated for the left and right eyes.

In this mode, rendering may include 360-degree panoramic rendering and VR glasses rendering.

Among them, 360-degree panoramic rendering typesets the left and right eye renderings of each group in an up-to-down 1:1 layout and combines them into a complete picture.

Referring to FIG. 4, in a 360 panorama typesetting method for left and right eye simulation through the left and right lenses of the 3D camera, the scenes captured by the left and right lenses of the 3D camera are respectively used as the left eye scene and the right eye scene, and are collected and processed to generate multiple groups The left-eye scene texture data and the right-eye scene texture data are simulated for the left and right eyes.

In this mode, the VR glasses rendering is to typeset the left and right eye renderings of each group in a left-to-right 1:1 layout and finally combine them into a complete picture.

It can be seen from the above embodiments that the present invention performs independent two 360 panorama renderings by using the 360-degree panoramic pictures of the left and right eyes and the virtual graphics and images of the virtual three-dimensional scene to simulate the position and perspective relationship of the human eye, respectively. When the user experiences, the left and right eyes respectively see the rendered pictures with poor perspectives, which is more realistic and more immersive.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A real-time aliasing rendering method for three-dimensional virtual reality (3D VR) video and a virtual three-dimensional scene, the method comprising:
   acquiring in real-time a video signal of a 3D camera and processing the video signal to generate texture data;
   creating a virtual three-dimensional scene according to a real scene ratio;
   adjusting rendering parameters of a virtual camera according to a relationship between a physical position of the 3D camera and a shooting angle;
   according to a picture effect captured by the 3D camera, aliasing the texture data in a form of texture maps to specific virtual three-dimensional objects in the virtual three-dimensional scene;
   adjusting a position of a virtual three-dimensional object of the specific virtual three-dimensional objects by a physical position relationship between the virtual three-dimensional scene and the real scene to form a virtual and reality combined three-dimensional scene; and
   adjusting a rendering process corresponding to the virtual camera rendering parameters, and using the virtual camera rendering parameters to render the virtual and reality combined three-dimensional scene to obtain a simulation rendering;
   wherein the video signal processing includes deinterlacing interlaced data and performing keying to a blue-green background of the video source data.

2. The real-time aliasing rendering method for 3D VR video and a virtual three-dimensional scene according to claim 1, wherein the texture data includes left-eye scene texture data and right-eye scene texture data, the left-eye scene texture data and the right eye scene texture data corresponds to left and right lenses of the 3D camera respectively, as a left-eye scene and a right-eye scene of a simulated human eye.

3. The real-time aliasing rendering method for 3D VR video and a virtual three-dimensional scene according to claim 2, wherein in the process of aliasing the texture data onto the specific virtual three-dimensional objects in the virtual three-dimensional scene, the left-eye scene texture data is used when the left-eye scene is aliased, and the right-eye scene texture data is used when the right-eye scene is aliased, so as to form a virtual and reality combined three-dimensional scene data of the left and right eyes.

4. The real-time aliasing rendering method for 3D VR video and a virtual three-dimensional scene according to claim 3, wherein a process of rendering the 3D scene data of the left and right eyes of the virtual and reality combination by using virtual camera rendering parameters is further based on:
   when a left camera parameter of the virtual camera is used to render the left eye 3D scene data, the texture maps uses data of the left lens of the virtual camera; when a right camera parameter of the virtual camera is used to render the right eye 3D scene data, the texture maps uses data of the right camera's virtual camera.

5. The real-time aliasing rendering method for 3D VR video and a virtual three-dimensional scene according to claim 1, wherein the virtual three-dimensional scene is created by using a fixed conversion ratio.

6. The real-time aliasing rendering method for 3D VR video and a virtual three-dimensional scene according to claim 1, wherein generating virtual camera-related parameters includes: the 3D camera position generates virtual camera position to simulate real camera position, and the 3D camera rotates to simulate real camera shooting angle and the 3D camera opening angle simulates the real camera zoom and lens distance simulates real camera lens distance.

7. The real-time aliasing rendering method for 3D VR video and a virtual three-dimensional scene according to claim 1, wherein simulated 3D rendering picture data is stored in a group of left and right eyes.

8. The real-time aliasing rendering method for 3D VR video and a virtual three-dimensional scene according to claim 1, wherein the rendering comprises 360-degree panoramic rendering and VR glasses rendering.

9. The real-time aliasing rendering method for 3D VR video and a virtual three-dimensional scene according to claim 1, wherein a 360-degree panoramic rendering typesets the left and right eye rendering pictures of each group in an up-to-down 1:1 layout and combines them into a complete picture; and VR glasses rendering typesets the left and right eye rendering pictures of each group in a left-to-right 1:1 layout and combines them into a complete picture.

10. A real-time aliasing rendering method for three-dimensional virtual reality (3D VR) video and a virtual three-dimensional scene, the method comprising:
   acquiring in real-time a video signal of a 3D camera and processing the video signal to generate texture data;
   creating a virtual three-dimensional scene according to a real scene ratio;
   adjusting rendering parameters of a virtual camera according to a relationship between a physical position of the 3D camera and a shooting angle;
   according to a picture effect captured by the 3D camera, aliasing the texture data in a form of texture maps to specific virtual three-dimensional objects in the virtual three-dimensional scene;
   adjusting a position of a virtual three-dimensional object of the specific virtual three-dimensional objects by a physical position relationship between the virtual three-dimensional scene and the real scene to form a virtual and reality combined three-dimensional scene; and
   adjusting a rendering process corresponding to the virtual camera rendering parameters, and using the virtual camera rendering parameters to render the virtual and reality combined three-dimensional scene to obtain a simulation rendering;
   wherein a 360-degree panoramic rendering typesets the left and right eye rendering pictures of each group in an up-to-down 1:1 layout and combines them into a complete picture; and
   VR glasses rendering typesets the left and right eye rendering pictures of each group in a left-to-right 1:1 layout and combines them into a complete picture.

* * * * *